United States Patent
Kang et al.

(10) Patent No.: US 11,803,268 B2
(45) Date of Patent: Oct. 31, 2023

(54) ELECTRONIC DEVICE USING ELECTRONIC PEN AND METHOD THEREOF

(71) Applicant: Samsung Electronics Co., Ltd., Suwon-si (KR)

(72) Inventors: Jiyoung Kang, Suwon-si (KR); Younghak Oh, Suwon-si (KR); Won Lee, Suwon-si (KR); Yoonjung Choi, Suwon-si (KR); Kangmoon Kim, Suwon-si (KR); Junwon Lee, Suwon-si (KR); Jaehyun Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/563,673

(22) Filed: Dec. 28, 2021

(65) Prior Publication Data

US 2022/0179536 A1     Jun. 9, 2022

Related U.S. Application Data

(63) Continuation of application No. PCT/KR2021/018341, filed on Dec. 6, 2021.

(30) Foreign Application Priority Data

Dec. 4, 2020  (KR) .......................... 10-2020-0168214

(51) Int. Cl.
  *G06F 3/038*     (2013.01)
  *G06F 3/041*     (2006.01)
  (Continued)

(52) U.S. Cl.
  CPC ........ *G06F 3/04162* (2019.05); *G06F 1/1607* (2013.01); *G06F 3/0383* (2013.01);
  (Continued)

(58) Field of Classification Search
  CPC .............. G06F 3/04162; G06F 1/1607; G06F 3/03545; G06F 3/0383; G06F 2200/1632; G06F 3/03547; G06V 40/1365
  See application file for complete search history.

(56) References Cited

U.S. PATENT DOCUMENTS

| 2010/0013790 A1 | 1/2010 | Ahn et al. |
| 2014/0015783 A1 | 1/2014 | Jeon |

(Continued)

FOREIGN PATENT DOCUMENTS

| CN | 110162197 A | 8/2019 |
| CN | 210199712 U | 3/2020 |

(Continued)

OTHER PUBLICATIONS

International Search Report dated Mar. 11, 2022, issued in International Application No. PCT/KR2021/018341.

*Primary Examiner* — Jonathan A Boyd
(74) *Attorney, Agent, or Firm* — Jefferson IP Law, LLP

(57) ABSTRACT

An electronic device is provided. The electronic device includes a communication module which can communicate with an electronic pen, and a processor, wherein the processor may determine the state of the electronic device, determine the state of the electronic pen, and, when the state of the electronic pen is determined that the electronic pen is attached to the electronic device and an input from the electronic pen is received through the communication module, perform a function related to the electronic pen based on the determined state of the electronic device.

18 Claims, 15 Drawing Sheets

(51) Int. Cl.
 *G06F 1/16* (2006.01)
 *G06V 40/12* (2022.01)
 *G06F 3/0354* (2013.01)

(52) U.S. Cl.
 CPC ...... *G06F 3/03545* (2013.01); *G06V 40/1365* (2022.01); *G06F 2200/1632* (2013.01)

(56) References Cited

U.S. PATENT DOCUMENTS

| | | | |
|---|---|---|---|
| 2015/0049065 A1 | 2/2015 | Chen | |
| 2015/0071544 A1 | 3/2015 | Ito | |
| 2015/0234528 A1* | 8/2015 | Choi | G06F 3/04883 345/173 |
| 2015/0241992 A1* | 8/2015 | Cho | G06F 1/266 345/179 |
| 2016/0109968 A1 | 4/2016 | Roh et al. | |
| 2017/0371434 A1 | 12/2017 | Kobori | |
| 2018/0081398 A1* | 3/2018 | Shin | G09G 5/005 |
| 2019/0369755 A1* | 12/2019 | Roper | G06F 3/0481 |
| 2020/0117835 A1* | 4/2020 | Olschowy | G06F 21/64 |
| 2021/0026462 A1 | 1/2021 | Seo et al. | |

FOREIGN PATENT DOCUMENTS

| | | |
|---|---|---|
| JP | H08-249114 A | 9/1996 |
| JP | 2003-345503 A | 12/2003 |
| JP | 6123597 B2 | 5/2017 |
| JP | 6677587 B2 | 4/2020 |
| KR | 10-2005-0013315 A | 2/2005 |
| KR | 10-2011-0136953 A | 12/2011 |
| KR | 10-2014-0005416 A | 1/2014 |
| KR | 10-2014-0010593 A | 1/2014 |
| KR | 10-1401271 B1 | 5/2014 |
| KR | 10-2014-0120261 A | 10/2014 |
| KR | 10-2015-0033869 A | 4/2015 |
| KR | 10-2016-0046668 A | 4/2016 |
| KR | 10-2016-0105114 A | 9/2016 |

\* cited by examiner

ELECTRONIC DEVICE USING ELECTRONIC PEN AND METHOD THEREOF

CROSS-REFERENCE TO RELATED APPLICATION(S)

This application is a continuation application, claiming priority under § 365(c), of an International application No. PCT/KR2021/018341, filed on Dec. 6, 2021, which is based on and claims the benefit of a Korean patent application number 10-2020-0168214, filed on Dec. 4, 2020, in the Korean Intellectual Property Office the disclosure of which is incorporated by reference herein in its entirety.

TECHNICAL FIELD

The disclosure relates to an electronic device using an electronic pen and a method thereof. More particularly, the disclosure relates to an electronic device using an electronic pen that can be attached to/detached from the outside of an electronic device to control the electronic device even when the electronic pen is attached to the electronic device.

BACKGROUND ART

Emergence of smartphones and tablets has made it difficult to find paper and pens in everyday life. Use of smart devices is ever-increasing in line with eco-friendly trends and construction of "paperless" environments that can change business styles more efficiently, and paper and pens are replaced with smart devices and electronic pens (for example, stylus pens) in line with rapid transition to mobile eras. Electronic pens have previously been needed for specific purposes only, but have gradually become sophisticated and equipped with many functions, thereby expanding their roles as new tools capable of replacing paper and pens.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

When an electronic pen is inserted into an electronic device, the thickness of the electronic device may increase. The user may fail to use the electronic pen while the electronic pen is inserted into the electronic device.

Aspects of the disclosure are to address at least the above-mentioned problems and/or disadvantages and to provide at least the advantages described below. Accordingly, an aspect of the disclosure is to provide a method and an electronic device using an electronic pen that can be attached to/detached from the outside of an electronic device to control the electronic device even when the electronic pen is attached to the electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication module capable of communicating with an electronic pen, and a processor, wherein the processor is configured to determine the state of the electronic device, determine the state of the electronic pen, and when the state of the electronic pen is determined that the electronic pen is attached to the electronic device and an input from the electronic pen is received through the communication module, perform a function related to the electronic pen based on the determined state of the electronic device.

In accordance with another aspect of the disclosure, a method for operating an electronic device is provided. The method includes determining the state of the electronic device, determining the state of an electronic pen, and when the state of the electronic pen is determined that the electronic pen is attached to the electronic device and an input is received from the electronic pen, performing the function related to the electronic pen based on the determined state of the electronic device.

Advantageous Effects of Invention

According to the disclosure, an electronic pen that can be attached to/detached from the outside of an electronic device may be used to control the electronic device even when the electronic pen is attached to the electronic device. When the electronic pen is available even when attached to the electronic device, the electronic pen may include hardware elements, such as buttons and sensors of the electronic device. When the electronic pen includes hardware elements, such as buttons and sensors, the electronic pen may have more functions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
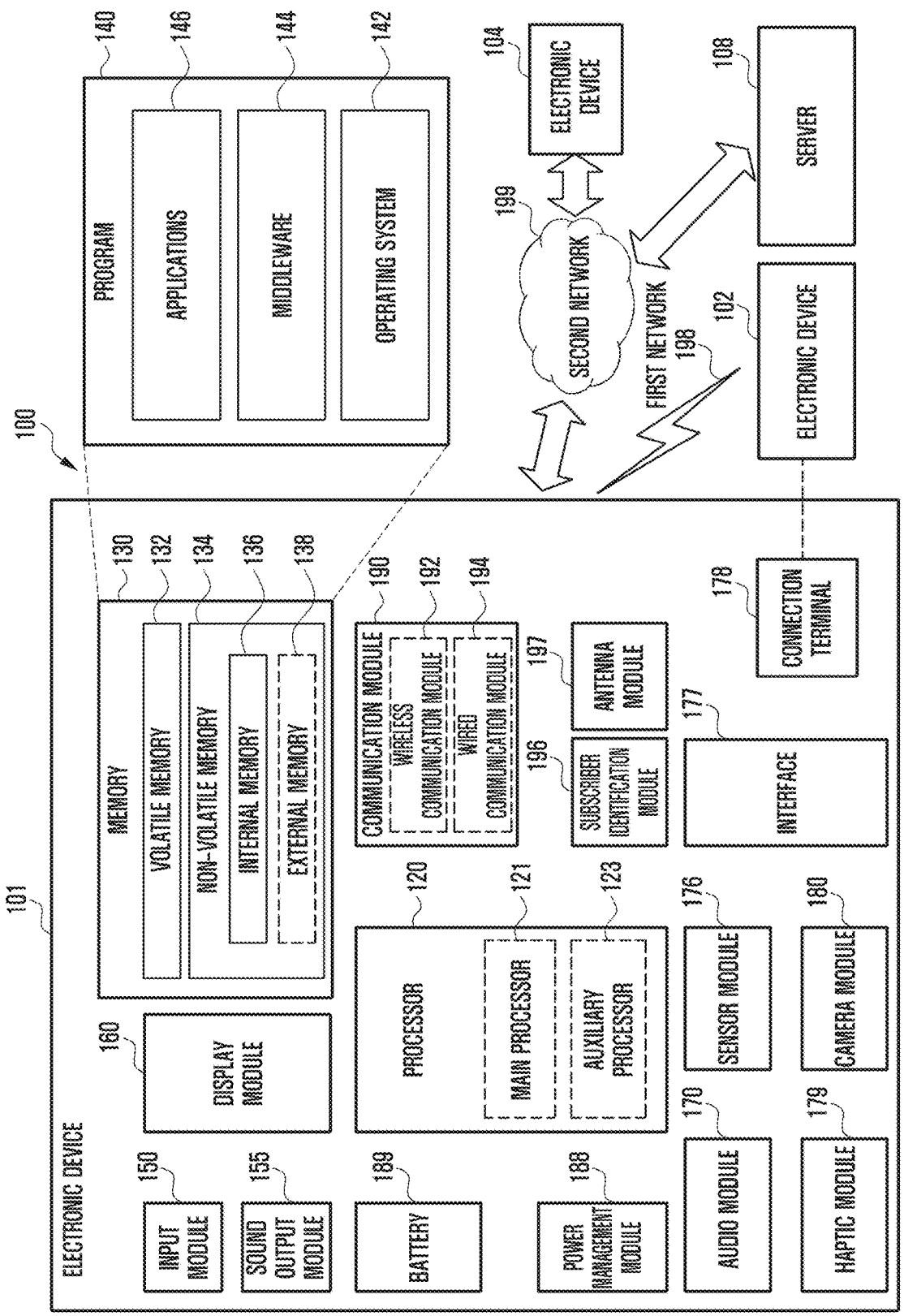
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
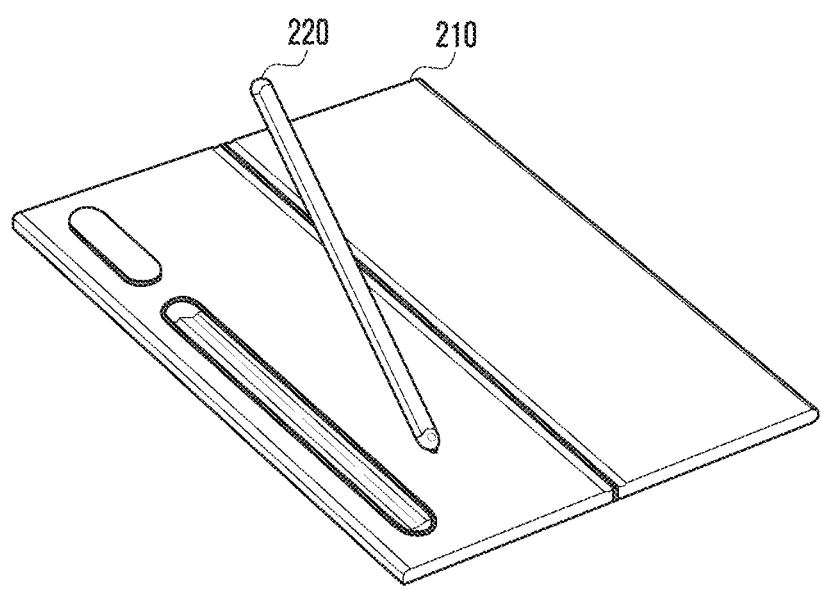
FIGS. 2A and 2B are views illustrating an electronic device including an electronic pen attachable to one side of an exterior thereof according to various embodiments of the disclosure.
Figure 2B:
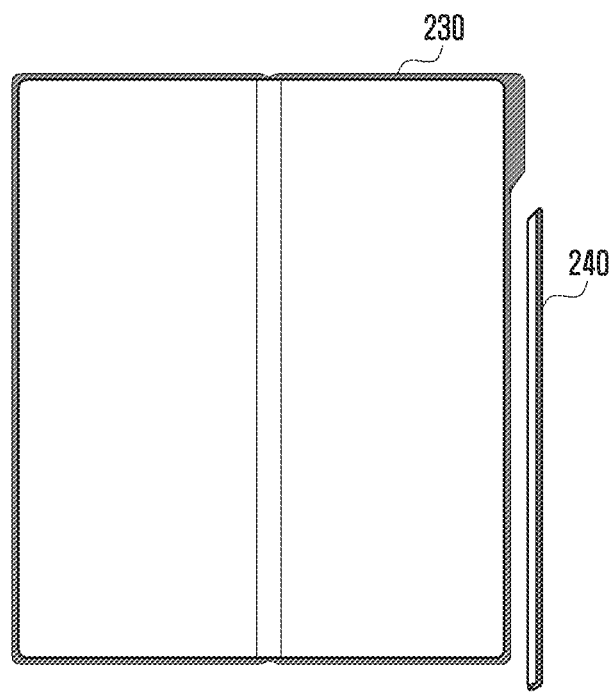

FIGS. 2A and 2B are views illustrating an electronic device including an electronic pen attachable to one side of an exterior according to various embodiments of the disclosure.

Referring to FIGS. 2A and 2B, an electronic device 210 and 230 may be a foldable electronic device. According to an embodiment of the disclosure, as illustrated in FIG. 2A, an electronic pen 220 may be attached to a rear surface of the electronic device 210. A groove is formed on the rear surface of the electronic device 210 so that a user may insert the electronic pen 220 into the groove of the electronic device 210 to store the electronic pen or may use the electronic pen 220 while the electronic pen is inserted into the groove of the electronic device 210. According to an embodiment of the disclosure, as illustrated in FIG. 2B, an electronic pen 240 may be attached to a side surface of an electronic device 230. A user may attach the electronic pen 240 to the side surface of the electronic device 230 to store the electronic pen and may use the electronic pen while the electronic pen is attached to the side surface of the electronic device 230. The disclosure is described with a foldable electronic device as an example in FIG. 2, but may also be applied to different types of electronic devices, such as a bar-type electronic device, and a rollable electronic device. The thickness of the electronic device may be reduced when the electronic pen is not inserted into the electronic device and is attached to one side of the exterior thereof as described herein. As the electronic pen is attached to one side of the exterior of the electronic device, a user can easily attach or detach the electronic pen. According to various embodiments of the disclosure, when the electronic pen includes a hardware component, such as a button and a sensor, the electronic pen may share or replace some functions of the electronic device. For example, a function of a hardware button included in the electronic device may be performed by a hardware button included in the electronic pen by replacing the same.

Figure 3:
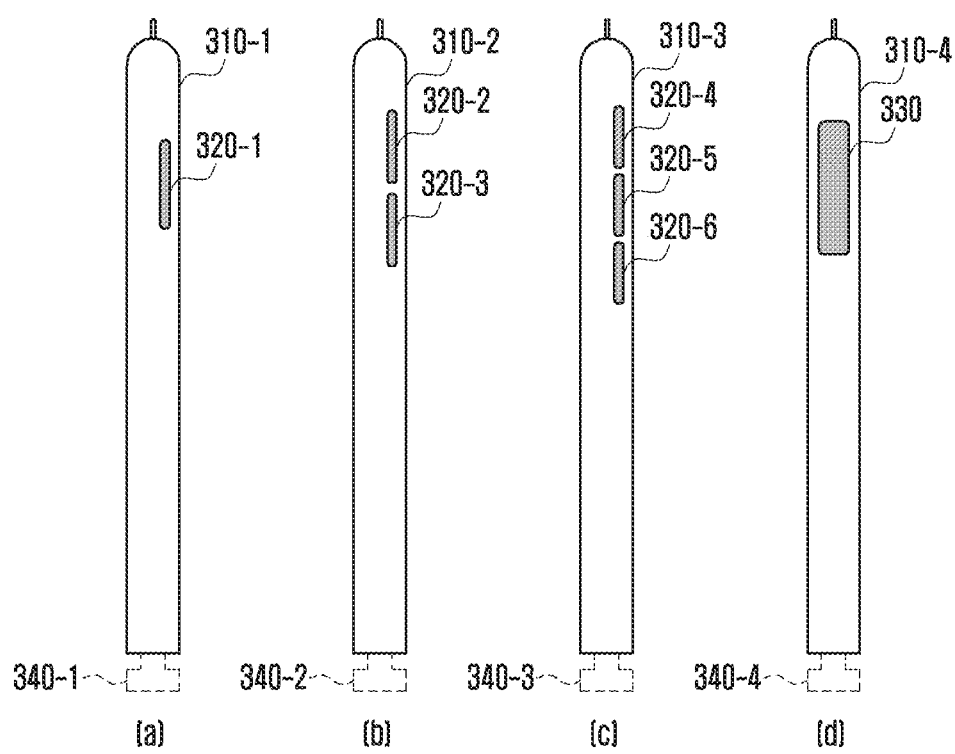
FIG. 3 is a view illustrating an electronic pen according to an embodiment of the disclosure.

FIG. 3 is a view illustrating an electronic pen according to an embodiment of the disclosure.

Referring to parts (a) to (d) of FIG. 3, an electronic pen 310-1 to 310-4 may include a hardware component. For example, the electronic pen 310-1 to 310-4 may include a button 320-1 to 320-6. The number, position, or size of the button 320-1 to 320-6 may not be limited. In another example, the electronic pen 310-1 to 310-4 may include a touch pad 330. According to an embodiment of the disclosure, the touch pad 330 may recognize a fingerprint.

According to an embodiment of the disclosure, the electronic pen 310-1 to 310-4 may include a button 340-1 to 340-4 formed in a lower end portion. The button 340-1 to 340-4 disposed in the lower end portion of the electronic pen 310-1 to 310-4 may be a hardware button (e.g., a toggle button). The button 340-1 to 340-4 disposed in the lower end portion of the electronic pen 310-1 to 310-4 may control an operation mode of the electronic device. For example, in the state in which the electronic pen 310-1 to 310-4 is detached from the electronic device and the button 340-1 to 340-4 of the lower end portion is pressed, the electronic device recognizes that the electronic pen 310-1 to 310-4 is in a mode of performing an original function of an electronic pen. In another example, in a state in which the electronic pen 310-1 to 310-4 is detached from the electronic device and the button 340-1 to 340-4 of the lower end portion is not pressed, the electronic device may recognize that the electronic pen is in a mode of receiving a hardware key input of an electronic pen. These modes may be changed by a setting of a user.

Figure 4:
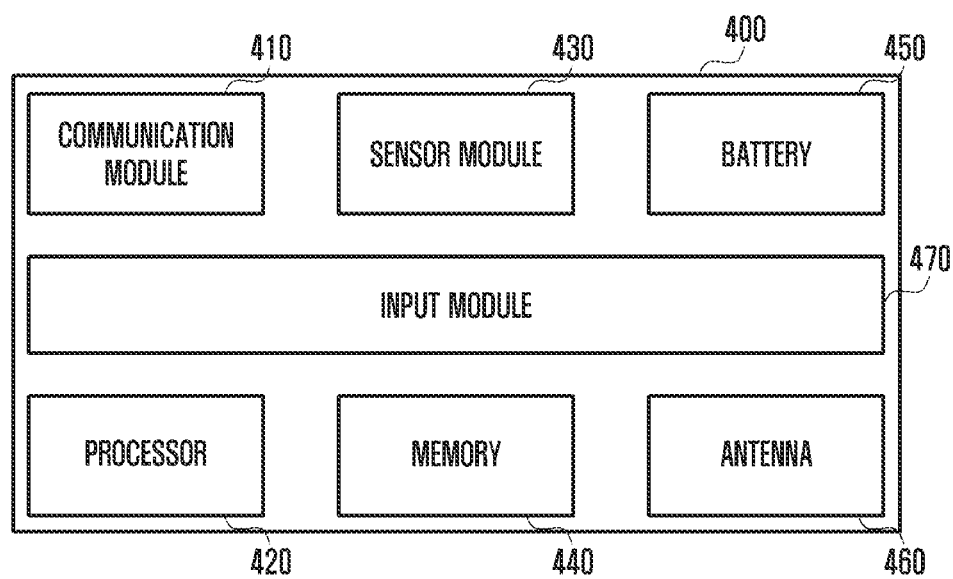
FIG. 4 is a view illustrating a configuration of an electronic pen according to an embodiment of the disclosure.

FIG. 4 is a view illustrating a configuration of an electronic pen according to an embodiment of the disclosure.

Referring to FIG. 4, an electronic pen 400 may include a communication module 410, a processor 420, a sensor module 430, a memory 440, a battery 450, and an antenna 460, and, even when at least a part of the illustrated configuration is omitted or substituted, various embodiments of the disclosure can be implemented.

According to various embodiments of the disclosure, the communication module 410 is configured to communicate with a wireless communication module (e.g., a wireless communication module 190) of the electronic device (e.g., an electronic device 101 of FIG. 1), and may support short-range wireless communication method (e.g., Bluetooth, Bluetooth low energy (BLE), wireless LAN) identical to the wireless communication module of the electronic device 101. When the electronic pen 400 is separated from the electronic device 101, the communication module 410 may perform a wireless communication connection with the wireless communication module 190 of the electronic device. The communication module 410 may transfer status information and input information of the electronic pen 400 to the electronic device by using a short-range communication method. For example, the communication module 410 may transfer direction information of the electronic pen 400 (e.g., a motion sensor data), voice information input through a microphone, or residual quantity information of the battery 450 to the electronic device 101.

According to various embodiments of the disclosure, the processor 420 may perform a function of controlling each element of the electronic pen 400. For example, the processor 420 may provide an input of a user to the wireless communication module 190 of the electronic device 101 by using the communication module 410.

According to various embodiments of the disclosure, the sensor module 430 may include at least one sensor. The sensor module 430 may include a gyro sensor, an acceleration sensor, and the like, and may detect a motion input, such as a movement and an operation of the electronic pen 400 according to use by a user. The electronic pen 400 may determine, by using the sensor module 430, whether the electronic pen 400 is detached from or attached to the electronic device 101.

According to various embodiments of the disclosure, the memory 440 may store information related to the operation of the electronic pen 400. For example, the information may include information for the communication with the electronic device 101 and frequency information related to an input operation of the electronic pen 400.

According to various embodiments of the disclosure, the battery 450 may be configured to store power required for the operation of the electronic pen 400. The battery may include, for example, a lithium-ion battery, or a capacitor, and may be rechargeable or replaceable.

According to various embodiments of the disclosure, the antenna 460 may be used to transmit or receive a signal or power to or from the outside (e.g., the electronic device 101). According to an embodiment of the disclosure, the electronic pen 400 may include the plurality of antennas 460, and may select at least one antenna suitable for the communication method among the antennas. The communication module 410 may exchange a signal or power with the electronic device 101 through the selected at least one antenna.

According to various embodiments of the disclosure, an input module 470 may include a button and/or a touch pad. The position, size, and number of the button and/or the touch pad may not be limited. According to various embodiments of the disclosure, an input through the button may include single click of the button, double click of the button, long click of the button, or the like, and a sequence of button input performed multiple times may be specified as one button input. According to various embodiments of the disclosure, the touch pad can recognize a fingerprint and thus can be used for a security function. In the disclosure, a type of a user input is not limited to the description above, and well-known method or a method which can be implemented by a person skilled in the art may be included.

Figure 5:
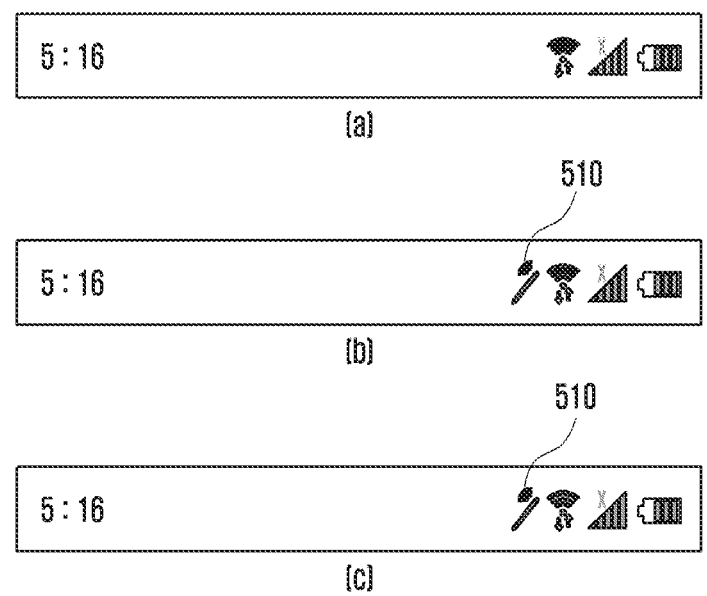
FIG. 5 is a view illustrating an electronic device on which whether an electronic pen is attached or detached is displayed according to an embodiment of the disclosure.

FIG. 5 is a view illustrating an electronic device on which whether an electronic pen is attached or detached is displayed according to an embodiment of the disclosure.

Referring to part (a) of FIG. 5, it illustrates an upper end of a display in a state in which the electronic pen is attached to the electronic device, and nothing may be displayed.

Referring to part (b) of FIG. 5, when the electronic pen is detached from the electronic device and the electronic device recognizes the electronic pen, an indicator 510 configured to indicate the electronic pen may blink at the upper end of the display for a predetermined time.

Referring to part (c) of FIG. 5, when a predetermined time elapses after the electronic pen is detached from the electronic device, the indicator 510 configured to indicate the electronic pen may be continuously displayed on the upper end of the display. The indicator 510 configured to indicate the electronic pen blinks as an example in FIG. 5, but the indicator 510 configured to indicate the electronic pen may indicate by using the color, size, shape of the indicator.

Figure 6:
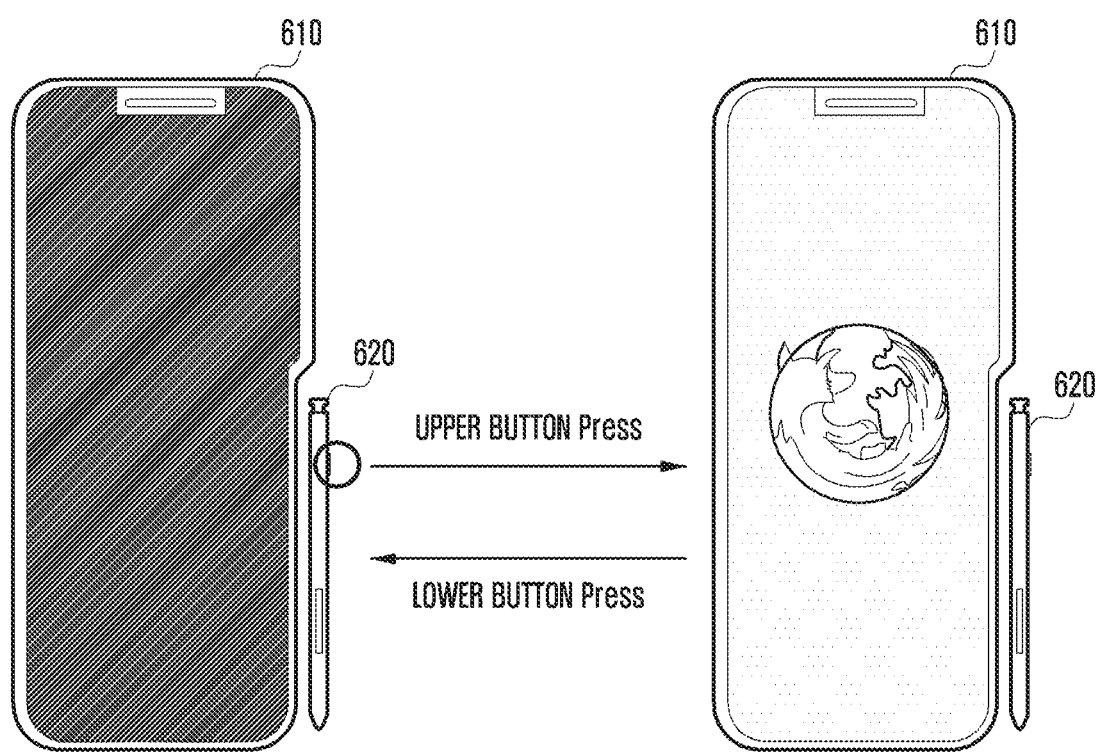
FIG. 6 is a view illustrating using a button of an electronic device according to an embodiment of the disclosure.
Figure 7:
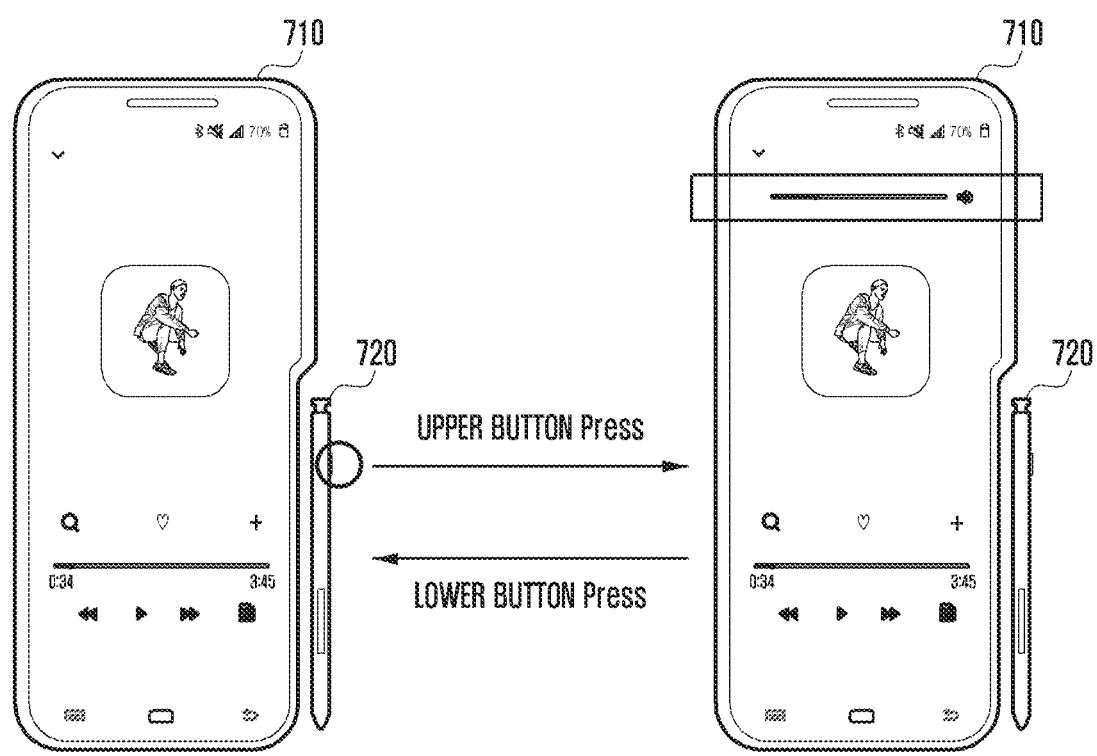
FIG. 7 is a view illustrating using a button of an electronic pen according to an embodiment of the disclosure.
Figure 8:
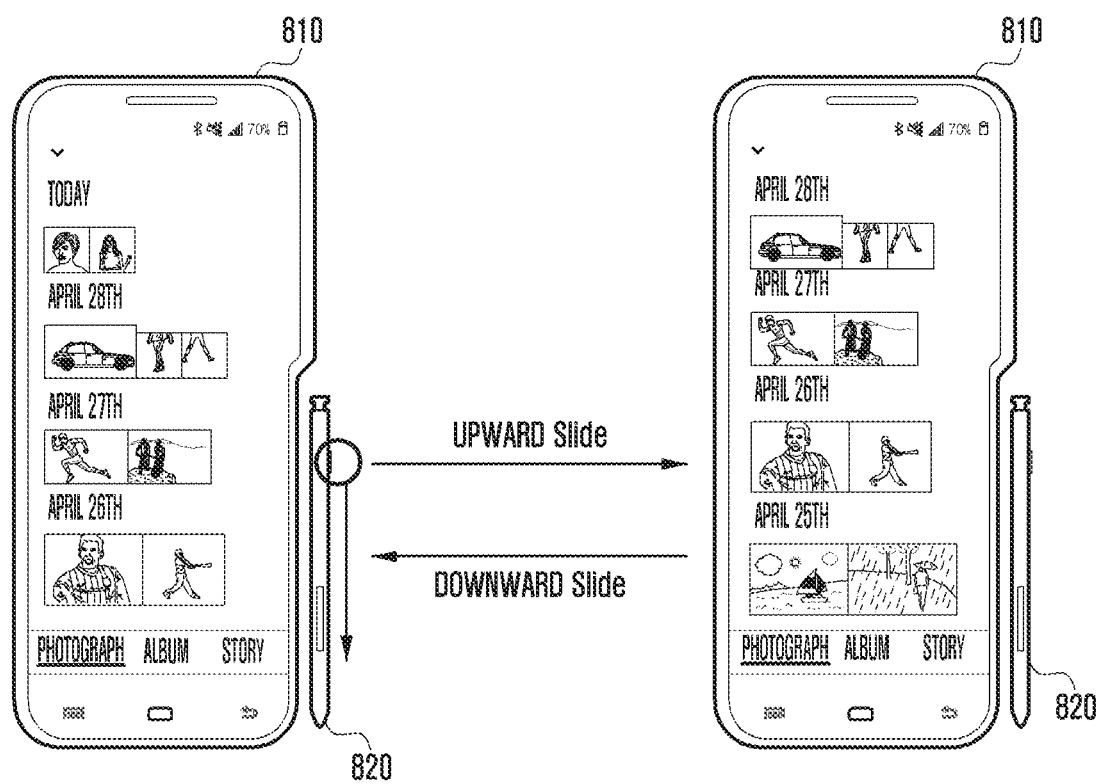
FIG. 8 is a view illustrating using a touch pad of an electronic pen according to an embodiment of the disclosure.

FIGS. 6 to 8 may illustrate an example of using the electronic pen in a state in which the electronic pen is attached to the side surface of the exterior of the electronic device.

FIG. 6 is a view illustrating using a button of an electronic device according to an embodiment of the disclosure.

Referring to FIG. 6, an electronic device 610 may be a foldable electronic device, and an electronic pen 620 may be attached to the side surface of the exterior of the electronic device 610. According to various embodiments of the disclosure, the electronic device 610 may not have a button, and the electronic pen 620 may have the button (e.g., two) disposed thereon.

According to various embodiments of the disclosure, the electronic device 610 may determine the state of the electronic device 610. The state of the electronic device 610 may be divided into a folded state or unfolded state. The state of the electronic device may be divided. The electronic device 610 may determine an application currently running or being displayed on the display. As illustrated in FIG. 6, when the electronic device 610 is in the folded state and the display is turned off, a user can turn on the display by pressing a button (e.g., an upper button) of the electronic pen 620. When the electronic device 610 is in the folded state and the display is turned on, the user can turn off the display by pressing a button (e.g., a lower button) of the electronic pen 620.

FIG. 7 is a view illustrating using a button of an electronic pen according to an embodiment of the disclosure.

Referring to FIG. 7, an electronic device 710 may be a foldable electronic device, and an electronic pen 720 may be attached to the side surface of the exterior of the electronic device 710. According to various embodiments of the disclosure, the electronic device 710 may not have a button, and the electronic pen 720 may have the button (e.g., two) disposed thereon.

According to various embodiments of the disclosure, the electronic device 710 may determine the state of the electronic device 710. The electronic device 710 may also determine a currently running application.

It may be determined that the electronic device 710 is in the folded stat and a music playback application is running According to various embodiments of the disclosure, when the electronic device 710 in the folded state and the music playback application is running, a user can turn the volume up by pressing an upper button of the electronic pen 720 and turn the volume down by pressing a lower button thereof.

FIG. 8 is a view illustrating using a touch pad of an electronic pen according to an embodiment of the disclosure.

Referring to FIG. 8, an electronic device 810 may be a foldable electronic device, and an electronic pen 820 is attached to the side surface of the exterior of the electronic device 810. According to various embodiments of the disclosure, the electronic device 810 may not have a button, and the electronic pen 820 may have a touch pad disposed thereon.

According to various embodiments of the disclosure, the electronic device 810 may determine the state of the electronic device 810. The electronic device 810 may also determine a currently running application. Referring to FIG. 8, it may be determined that the electronic device 810 is in the folded state, and Gallery is running According to various embodiments of the disclosure, in a case in which the electronic device 810 is in the folded state and Gallery is running, a lower photograph is moved upward to be seen when a user slides up the touch pad of the electronic pen 820 and an upper photograph is moved downward to be seen when the user slide-down the touch pad.

Figure 9:
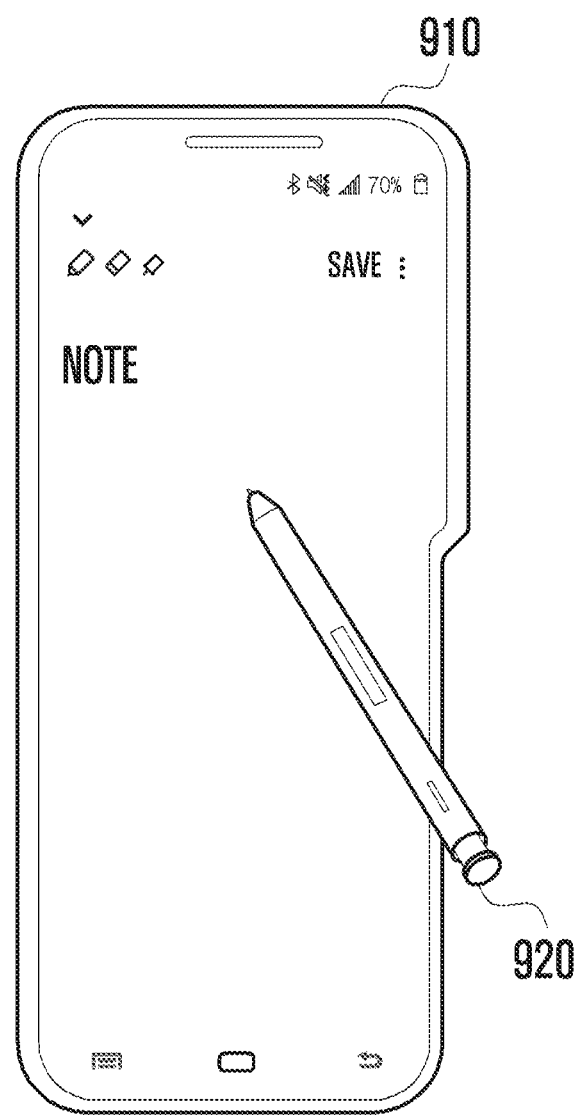
FIG. 9 is a view illustrating detaching an electronic device to use according to an embodiment of the disclosure.
Figure 10:
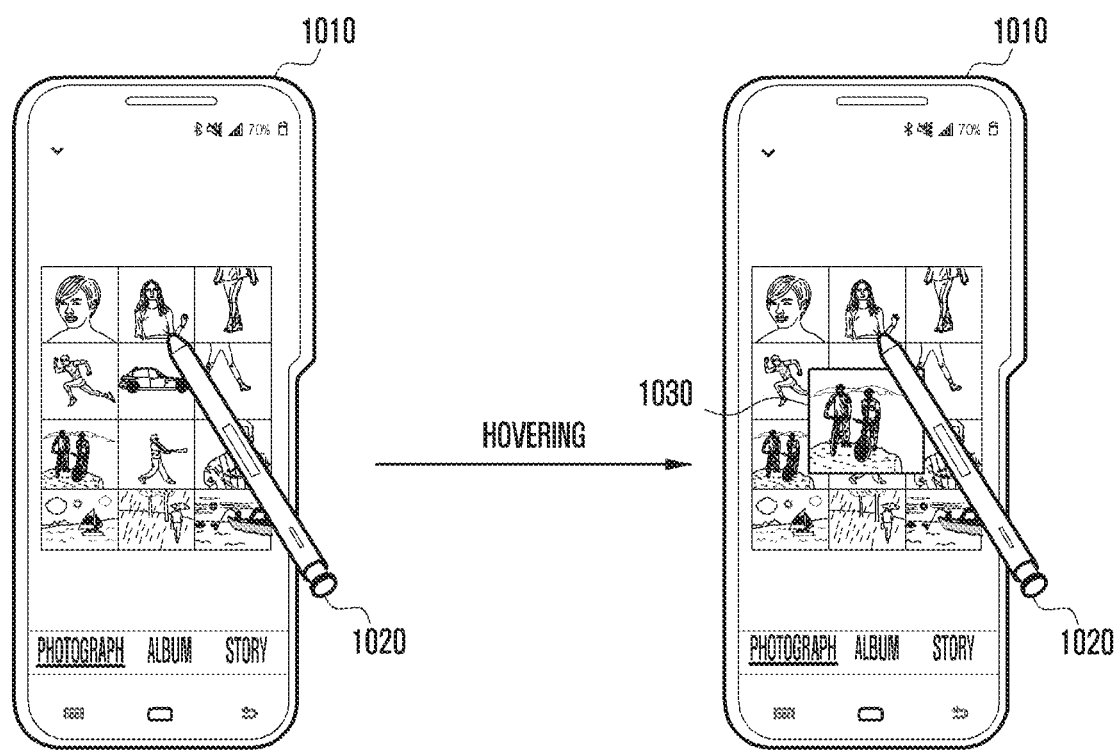
FIG. 10 is a view illustrating detaching an electronic pen to use according to an embodiment of the disclosure.

FIGS. 9 to 10 may illustrate using an electronic pen in a state in which the electronic pen is detached from an electronic device.

FIG. 9 is a view illustrating detaching an electronic device to use according to an embodiment of the disclosure.

Referring to FIG. 9, an electronic device 910 may be a foldable electronic device, and an electronic pen 920 may be detached from the side surface of the exterior of the electronic device 910. According to various embodiments of the disclosure, the electronic device 910 may not have a button, and the electronic pen 920 may have a button or a touch pad disposed thereon.

According to various embodiments of the disclosure, the electronic device 910 may determine the state of the electronic device 910. The electronic device 910 may also determine a currently running application. Referring to FIG. 9, when it is determined that the electronic pen 920 is detached (or separated) from the electronic device 910 and an application related to the function of the electronic pen 920 is not running, the electronic device 910 may use the electronic pen 920 according to its original function. For example, the electronic device 910 may execute a note application, and the user may use the electronic pen 920 to write and draw a picture.

FIG. 10 is a view illustrating detaching an electronic pen to use according to an embodiment of the disclosure.

Referring to FIG. 10, a user can execute a gallery application. When the gallery application is executed in an electronic device 1010 and an electronic pen 1020 is detached from the electronic device 1010, the user can use the electronic pen 1020 as a function related to the gallery application. For example, when the user performs hovering with the electronic pen 1020 above a specific picture, the specific picture may be enlarged or detailed information about the specific picture may be displayed.

Figure 11:
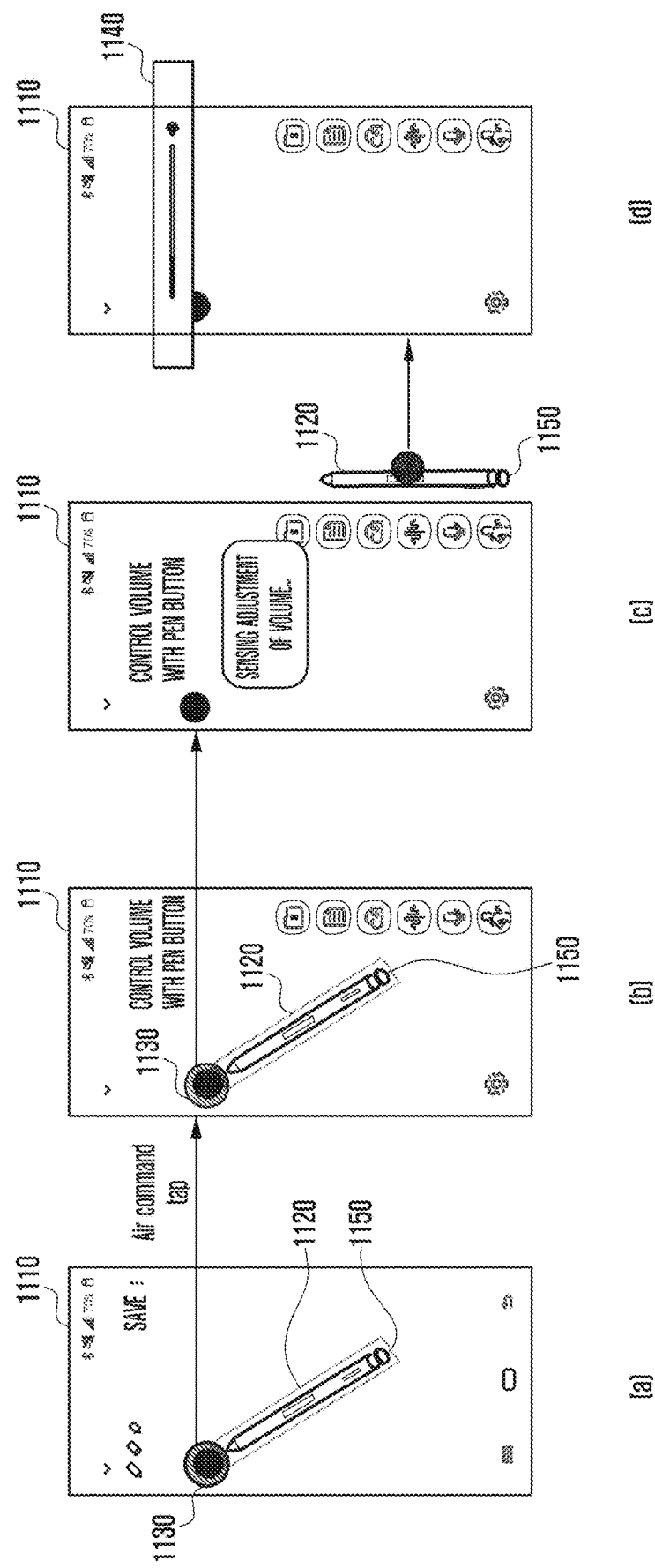
FIG. 11 is a view illustrating using all functions of an electronic pen in an attached/detached state according to an embodiment of the disclosure.

FIG. 11 is a view illustrating using all functions of an electronic pen in an attached/detached state according to an embodiment of the disclosure.

Referring to parts (a) to (d) of FIG. 11, an electronic device 1100 may execute both the music playback application and the note application. The music playback application may be executed in a background. The note application may be executed in a foreground. The user may want to control the volume of a music while using the electronic pen 1120 according to its original function by detaching an electronic pen 1120 from the electronic device 1100. The user may want to use both the functions in a state in which the electronic pen 1120 is attached to the electronic device 1110 and the functions in a state in which the electronic pen is detached from the electronic device.

According to various embodiments of the disclosure, the electronic pen 1120 may not support a function in the attached state while the electronic pen is detached. For example, when the electronic pen 1120 is being used according to its original function, the button disposed on the electronic pen 1120 may support a selection function so that the volume of the music may not be able to be controlled. The electronic device 1100 may add a function related to an air command 1130 which is a menu related to the electronic pen 1120 to support the function of the electronic pen 1120. The user can execute the air command 1130 by using the electronic pen 1120 as illustrated in part (a) of FIG. 11. The user may select a volume adjustment menu by using the air command 1130 as illustrated in part (b) of FIG. 11. When the user adjusts the volume by using the button disposed on the electronic pen 1120 as illustrated in part (c) of FIG. 11, a volume adjustment UI 1140 may be displayed on the display as illustrated in part (d) of FIG. 11.

According to various embodiments of the disclosure, the electronic pen 1120 may include a button 1150 (e.g., 340-1 to 340-4 in FIG. 3) at the lower end portion of the electronic pen 1120. A button 1150 disposed at the lower end portion of the electronic pen 1120 may be a hardware button. For example, the button 1150 disposed at the lower end portion of the electronic pen 1120 may be a toggle button.

According to various embodiments of the disclosure, in a state in which the button 1150 at the lower end portion is pressed while the electronic pen 1120 is detached from the electronic device 1100, the electronic device 1100 may recognize that the electronic device is in a mode of operating by the electronic pen 1120. In a state in which the button 1150 at the lower end portion is not pressed while the electronic pen 1120 is detached from the electronic device 1100, the electronic device 1100 may recognize that the electronic device in a mode of operating by the hardware key of the electronic pen 1120. The setting of the mode described above may be changed by a user.

Figure 12:
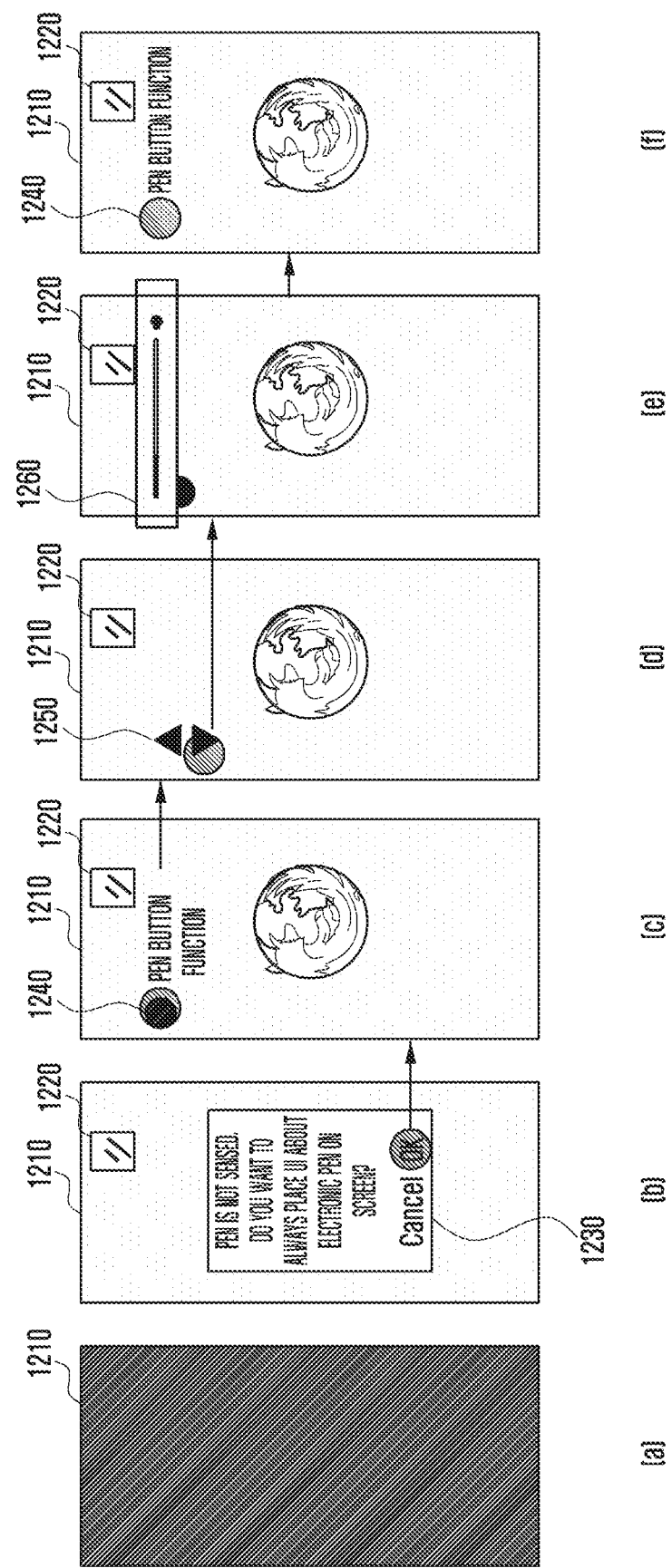
FIG. 12 is a view illustrating when an electronic pen is missing according to an embodiment of the disclosure.

FIG. 12 is a view illustrating when an electronic pen is missing according to an embodiment of the disclosure.

Referring to part (a) of FIG. 12, an electronic device 1210 may display nothing when the display is turned off even when the electronic pen is missing.

Thereafter, referring to part (b) of FIG. 12, the electronic device 1210 may display an indicator 1220 and a pop-up message 1230 which indicate that the electronic pen is missing when the display is turned on. The pop-up message 1230 may display, for example, "The pen is not detected. Do you want to always place the UI for the electronic pen on the screen?".

Referring to part (c) of FIG. 12, when the user clicks "OK" in the pop-up message 1230, a user interface (UI) 1240 for the electronic pen may be displayed on the display. The UI 1240 for the electronic pen may be for performing the function in the state in which the electronic pen is attached to the electronic device 1210.

Referring to part (d) of FIG. 12, when the UI 1240 for the electronic pen is selected (or touched), a UI 1250 for adjusting the volume may be displayed as.

Referring to part (e) of FIG. 12, when the user selects (or touches) the UI 1250 for adjusting the volume, a volume adjustment UI 1260 may be displayed on the display.

Referring to part (f) of FIG. 12, when the user does not select the volume adjustment UI 1260 for a predetermined time, the electronic device 1210 may display the UI 1240 for the electronic pen.

Figure 13:
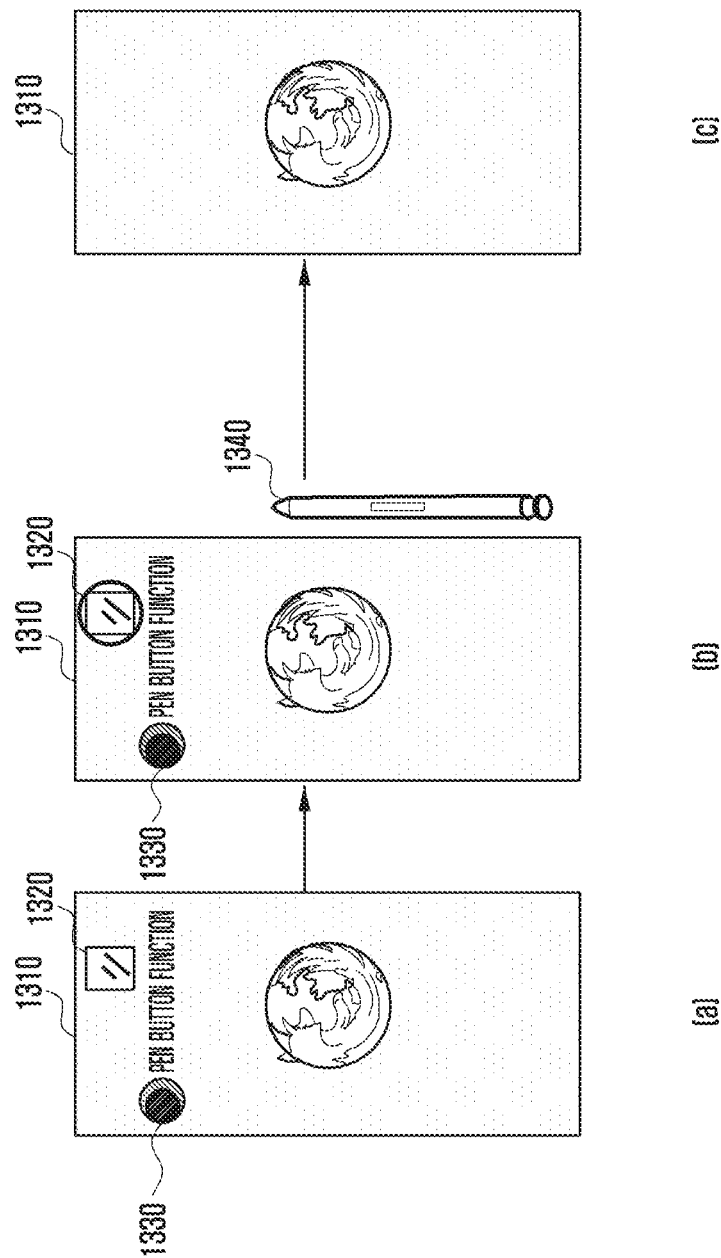
FIG. 13 is a view illustrating when a missing pen is found according to an embodiment of the disclosure.

FIG. 13 is a view illustrating when a missing pen is found according to an embodiment of the disclosure.

Referring to parts (a) to (c) of FIG. 13, when the electronic pen 1340 is detached from an electronic device 1310, an UI 1320 for the function of the electronic pen 1340 and an indicator 1330 configured to indicate the state of the electronic pen 1340 may be displayed at an upper end of the display of the electronic device 1310. When it is determined that the electronic pen 1340 is missing, the electronic device 1310 may indicate loss of the electronic pen 1340 by using the indicator 1330 configured to indicate the state of the electronic pen 1340. The electronic device 1310 may transmit a signal for detecting the electronic pen 1340 while the indicator 1330 configured to indicate the state of the electronic pen 1340 indicates the loss of the electronic pen 1340. When the electronic pen 1340 is detected or attached to the electronic device 1310, the electronic device 1310 may change the indicator 1330 configured to indicate the state of the electronic pen 1340.

Figure 14:
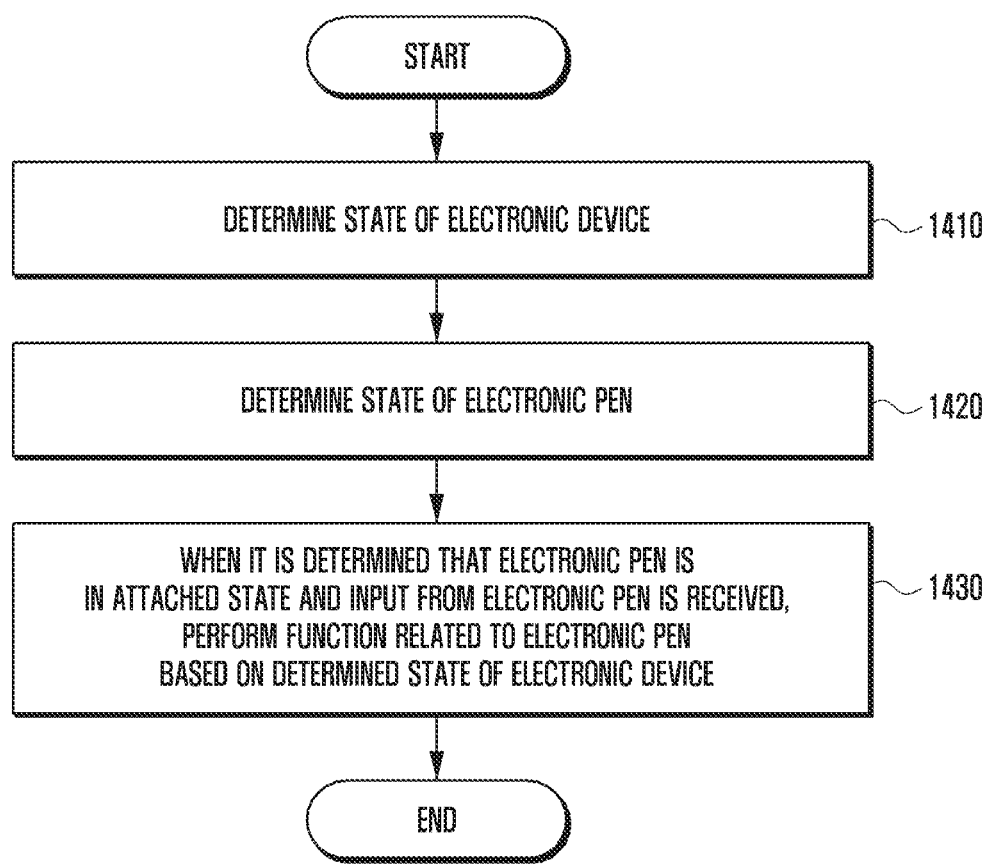
FIG. 14 is a flow chart of an electronic device according to an embodiment of the disclosure.

FIG. 14 is a flow chart of an electronic device according to an embodiment of the disclosure.

Referring to FIG. 14, at operation 1410, the electronic device (e.g., the electronic device 101 in FIG. 1) may determine the state of the electronic device. The state of the electronic device 101 may be a state according to the structural change of the electronic device. For example, when the electronic device 101 is a foldable electronic device, the electronic device 1010 is in the folded state or the unfolded state. The electronic device 101 may be unfolded at a predetermined angle. In another example, when the electronic device 101 is a rollable electronic device, the electronic device 101 may be in a state in which the display has moved into the electronic device 101 or moved out of the electronic device.

Referring to FIG. 14, at operation 1420, the electronic device 101 may determine the state of the electronic pen (e.g., the electronic pen 400 in FIG. 4). The electronic pen 400 may be attached to one side (e.g., a side surface, and a rear surface) of the exterior of the electronic device 101. The electronic device 101 may determine whether the electronic pen 400 is attached to or detached from the electronic device 101. According to various embodiments of the disclosure, the electronic device 101 may determine the attached/detached state of the electronic pen 400 by using a sensor. The electronic device 101 may determine the attached/detached state of the electronic pen 400 by using a communication module (e.g., the communication module 190 in FIG. 1). For example, the electronic device 101 may determine the distance by using the electronic pen 400 and the communication module to determine the attached/detached state of the electronic pen 400

Referring to FIG. 14, at operation 1430, when the state of the electronic pen 400 is determined that the electronic pen is attached and the input is received from the electronic pen 400, the electronic device 101 may perform the function related to the electronic pen based on the determined state of the electronic device 101. The input from the electronic pen 400 may be an input by a hardware configuration. For example, whether a button is pressed, whether there is an input to a touch pad, or the like may be an input from the electronic pen 400.

According to various embodiments of the disclosure, the electronic device 101 may determine an application being executed, and may perform the function related to the electronic pen by further considering the application being executed. For example, when the application being executed is a music playback application, the input of the electronic pen may be an input for adjusting the volume. In another example, the application being executed is an electronic book, the input of the electronic pen may be the movement of the page.

According to various embodiments of the disclosure, the input of the electronic pen may be an input through a hardware configuration. For example, the electronic pen may include a plurality of buttons so that an input of the button may be the input of the electronic pen. The electronic pen may include a touch pad, an input of the touch pad may be the input of the electronic pen.

An electronic device (e.g., the electronic device 210 in FIG. 2A) according to various embodiments of the disclosure may include a communication module (e.g., the communication module 410 in FIG. 4) configured to communicate with an electronic pen (e.g., the electronic pen 220 in FIG. 2A), and a processor (e.g., the processor 420 in FIG. 4), wherein the processor 420 determines the state of the electronic device 210, determines the state of the electronic pen 220, and, when the state of the electronic pen is determined that the electronic pen is attached to the electronic device and the input from the electronic pen is received through the communication module, performs the function related to the electronic pen based on the determined state of the electronic device.

The processor 420 of the electronic device according to various embodiments of the disclosure may further determine an application being executed by the electronic device, and perform the function related to the electronic pen by further considering the application being executed.

In the electronic device according to various embodiments of the disclosure, the state of the electronic device may be a state according to a structural change of the electronic device.

The electronic device according to various embodiments of the disclosure may further include a display, wherein the processor 420, when the state of the electronic state is determined that the electronic pen is detached from the electronic device, further displays, on the display, a user interface related to a function in the state in which the electronic pen is attached to the electronic device.

The electronic device according to various embodiments of the disclosure may further include a display, wherein the processor 420 displays the state of the electronic pen on the display.

In the electronic device according to various embodiments of the disclosure, the electronic pen may be attached to one side of the exterior of the electronic device.

In the electronic device according to various embodiments of the disclosure, the electronic pen may include a plurality of buttons, wherein the plurality of buttons have a function varying according to whether the electronic pen is detached from the electronic device.

The electronic device according to various embodiments of the disclosure may further include a display, wherein the processor 420 further displays the user interface related to the electronic pen on the display when the state of the electronic pen is determined that the electronic pen is missing.

The processor 420 of the electronic device according to various embodiments of the disclosure may determine the state of the electronic pen by using the communication module 410.

In the electronic device according to various embodiments of the disclosure, the electronic pen may include a touch pad capable of recognizing a fingerprint.

An operation method of the electronic device according to various embodiments of the disclosure may include an operation 1410 of determining the state of the electronic device, an operation 1420 of determining the state of the electronic pen, and an operation 1430 of, when the state of the electronic pen is determined that the electronic pen is attached to the electronic device and the input from the electronic pen is received, performing the function related to the electronic pen based on the determined state of the electronic device.

The operation method of the electronic device according to various embodiments of the disclosure may further include an operation of determining an application being executed by the electronic device, and an operation of performing the function related to the electronic pen by further considering the application being executed.

In the operation method of the electronic device according to various embodiments of the disclosure, the state of the electronic device may be a state according to a structural change of the electronic device.

The operation method of the electronic device according to various embodiments of the disclosure may include an operation of, when the state of the electronic pen is determined that the electronic pen is detached from the electronic device, displaying, on the display, a user interface related to a function in the state in which the electronic pen is attached to the electronic device.

The operation method of the electronic device according to various embodiments of the disclosure may further include an operation of displaying the state of the electronic pen on the display.

In the operation method of the electronic device according to various embodiments of the disclosure, the electronic pen may be attached to one side of the exterior of the electronic device.

In the operation method of the electronic device according to various embodiments of the disclosure, the electronic pen may include a plurality of buttons, wherein the plurality of buttons have a function varying according to whether the electronic pen is detached from the electronic device.

In the operation method of the electronic device according to various embodiments of the disclosure, when the state of the electronic pen is determined that the electronic pen is missing, a display may further display a user interface related to the electronic pen.

In the operation method of the electronic device according to various embodiments of the disclosure, the operation of determining the state of the electronic pen may be an operation of using a communication module for the determination.

In the operation method of the electronic device according to various embodiments of the disclosure, the electronic pen may include an electronic pad capable of recognizing a fingerprint.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a communication module capable of communicating with an electronic pen; and
a processor,
wherein the processor is configured to:
determine a state of the electronic device,
determine a state of the electronic pen,
when the state of the electronic pen is determined that the electronic pen is attached to the electronic device and an input from the electronic pen is received through the communication module, perform a function related to the electronic pen based on the determined state of the electronic device, and
when the state of the electronic pen is determined that the electronic pen is detached from the electronic device, display, in response to receiving a command from the electronic pen, a user interface for guiding functions executable using the electronic pen in the state in which the electronic pen is attached to the electronic device.

2. The electronic device of claim 1, wherein the processor is further configured to:
further determine an application being executed by the electronic device; and
perform the function related to the electronic pen by further considering the application being executed.

3. The electronic device of claim 1, wherein the state of the electronic device is a state according to a structural change of the electronic device.

4. The electronic device of claim 1, further comprising a display,
wherein the processor is further configured to display the state of the electronic pen on the display.

5. The electronic device of claim 1, wherein the electronic pen is capable of being attached to one side of an exterior of the electronic device.

6. The electronic device of claim 5,
wherein the electronic pen includes a plurality of buttons, and
wherein the plurality of buttons have a function varying according to whether the electronic pen is detached from the electronic device.

7. The electronic device of claim 1, further comprising a display,
wherein the processor is further configured to further display a user interface related to the electronic pen on the display when the state of the electronic pen is determined that the electronic pen is missing.

8. The electronic device of claim 1, wherein the processor is further configured to determine the state of the electronic pen by using the communication module.

9. The electronic device of claim 1, wherein the electronic pen includes an electronic pad capable of recognizing a fingerprint.

10. A method for operating an electronic device, the method comprising:
determining a state of the electronic device;
determining a state of an electronic pen;
when the state of the electronic pen is determined that the electronic pen is attached to the electronic device and an input is received from the electronic pen, performing a function related to the electronic pen based on the determined state of the electronic device; and
when the state of the electronic pen is determined that the electronic pen is detached from the electronic device, displaying, in response to receiving a command from the electronic pen, a user interface for guiding functions executable using the electronic pen in the state in which the electronic pen is attached to the electronic device.

11. The method of claim 10, further comprising:
   determining an application being executed by the electronic device; and
   performing the function related to the electronic pen by further considering the application being executed.

12. The method of claim 10, wherein the state of the electronic device is a state according to a structural change of the electronic device.

13. The method of claim 10, further comprising displaying the state of the electronic pen on the display.

14. The method of claim 10, wherein the electronic pen is capable of being attached to one side of an exterior of the electronic device.

15. The method of claim 10,
   wherein the electronic pen includes a plurality of buttons, and
   wherein the plurality of buttons have a function varying according to whether the electronic pen is detached from the electronic device.

16. The method of claim 10, further displaying a user interface related to the electronic pen on a display when the state of the electronic pen is determined that the electronic pen is missing.

17. The method of claim 10, wherein, in the determining of the state of the electronic pen, a communication module is used to determine the state.

18. The method of claim 10, wherein the electronic pen includes an electronic pad capable of recognizing a fingerprint.

\* \* \* \* \*